(No Model.)
H. R. CASSEL.
SEWER GAS TRAP.
No. 268,865. Patented Dec. 12, 1882.
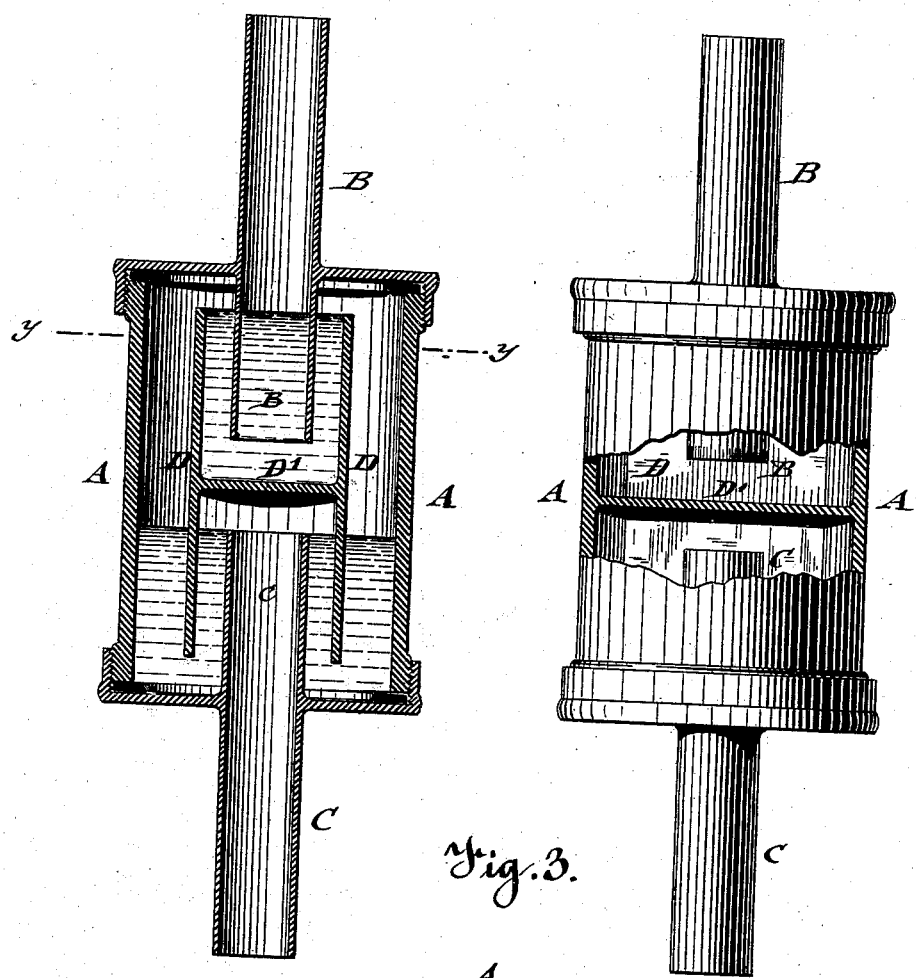
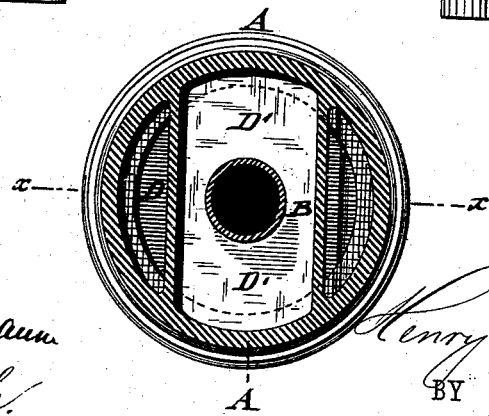
WITNESSES:
Jol. U. Rosenbaum
Otto Risch
INVENTOR
Henry R. Cassel
BY Paul Goepel
ATTORNEY

UNITED STATES PATENT OFFICE.

HENRY R. CASSEL, OF NEW YORK, N. Y.

SEWER-GAS TRAP.

SPECIFICATION forming part of Letters Patent No. 268,865, dated December 12, 1882.

Application filed April 29, 1882. (No model.)

*To all whom it may concern:*

Be it known that I, HENRY R. CASSEL, of the city, county, and State of New York, have invented certain new and useful Improvements in Sewer-Gas Traps, of which the following is a specification.

This invention relates to an improved sewer-gas trap for sinks, wash-basins, and other purposes, by which a double seal is obtained against the entrance of sewer-gases, and by which any possibility of the so-called "siphoning off" of the liquid in the trap is prevented.

The invention consists of a sewer-gas trap formed of an exterior chamber, in the interior of which the induction and eduction pipes terminate. The ends of the pipes are surrounded in the chamber by a cylinder that is open at the top and bottom, but divided intermediately between the ends of the pipes by a transverse diaphragm or partition, whereby the liquid to be conducted off is first supplied to the upper section of the interior cylinder, so as to seal the end of the pipe, and then shed to the lower part of the exterior chamber, so as to form a second seal at the lower part of the interior cylinder.

In the accompanying drawings, Figure 1 represents a vertical transverse section of my improved sewer-gas trap on line $x\,x$, Fig. 3. Fig. 2 is a side elevation with a part broken away to show the trap in longitudinal section; and Fig. 3 is a horizontal section of the same on line $y\,y$, Fig. 1.

Similar letters of reference indicate corresponding parts.

In the drawings, A represents the exterior chamber of my improved sewer-gas trap, which chamber is preferably made of cylindrical shape, and of cast metal or other suitable material. It is provided with detachable and tightly-packed heads, to which the induction and eduction pipes B and C are respectively applied. Both the induction and eduction pipes B and C are extended to the interior of the chamber A, and surrounded within the same by an interior cylinder, D, which is provided with a horizontal partition or diaphragm, D', at a point intermediately between the ends of the induction and eduction pipes B and C. The interior cylinder, D, is made of less height than the exterior chamber, A, and either concentric therewith or of a cross-section in the shape of an H, as shown in Fig. 1, so that spaces are formed between the walls of the interior cylinder and the exterior chamber, A, through which the liquid that is delivered to the upper part of the interior cylinder, D, is conducted to the lower part of the exterior chamber, A, and into the lower part of the cylinder D. The interior cylinder, D, may be made in a separate piece from the chamber or cast in one piece therewith, as desired.

By the passage of the liquid through the interior of the trap a hydraulic seal is formed in the upper part of the interior cylinder, D, at the end of the induction-pipe B, and a second hydraulic seal at the lower part of the interior cylinder, D, as shown clearly in Fig. 1. The liquid to be conducted off passes from the induction-pipe B to the upper part of the interior cylinder, D, is then shed over the upper edge of the same along the connecting-spaces into the lower part of the main chamber A, rises then in the interior of the cylinder D until the level of the end of the eduction-pipe C is reached, when the liquid is shed over the end of the eduction-pipe and conducted off. The sewer-gases are prevented from passing through the trap and the induction-pipe to the interior of the building by the liquid in the trap, as in order to do it the gas would be compelled to penetrate first downward and upward through the liquid of the lower seal, and then downward and upward again through the liquid of the upper seal, which is impossible. As there is always a double seal in the trap—one at the end of the induction-pipe B and the other at the lower part of the interior cylinder—the siphoning off of the liquid in the trap is effectively prevented, and consequently the ingress of sewer-gas entirely obviated.

Having thus described my invention, I claim as new and desire to secure by Letters Patent—

A sewer-gas trap consisting of an exterior chamber, into which the induction and eduction pipes terminate, and of an interior cylinder of less height than the exterior chamber, said cylinder having a transverse diaphragm intermediately between the ends of the induction and eduction pipes, substantially as and for the purpose set forth.

In testimony that I claim the foregoing as my invention I have signed my name in presence of two subscribing witnesses.

HENRY R. CASSEL.

Witnesses:
PAUL GOEPEL,
CARL KARP.